H. C. TSIEN   INVENTOR

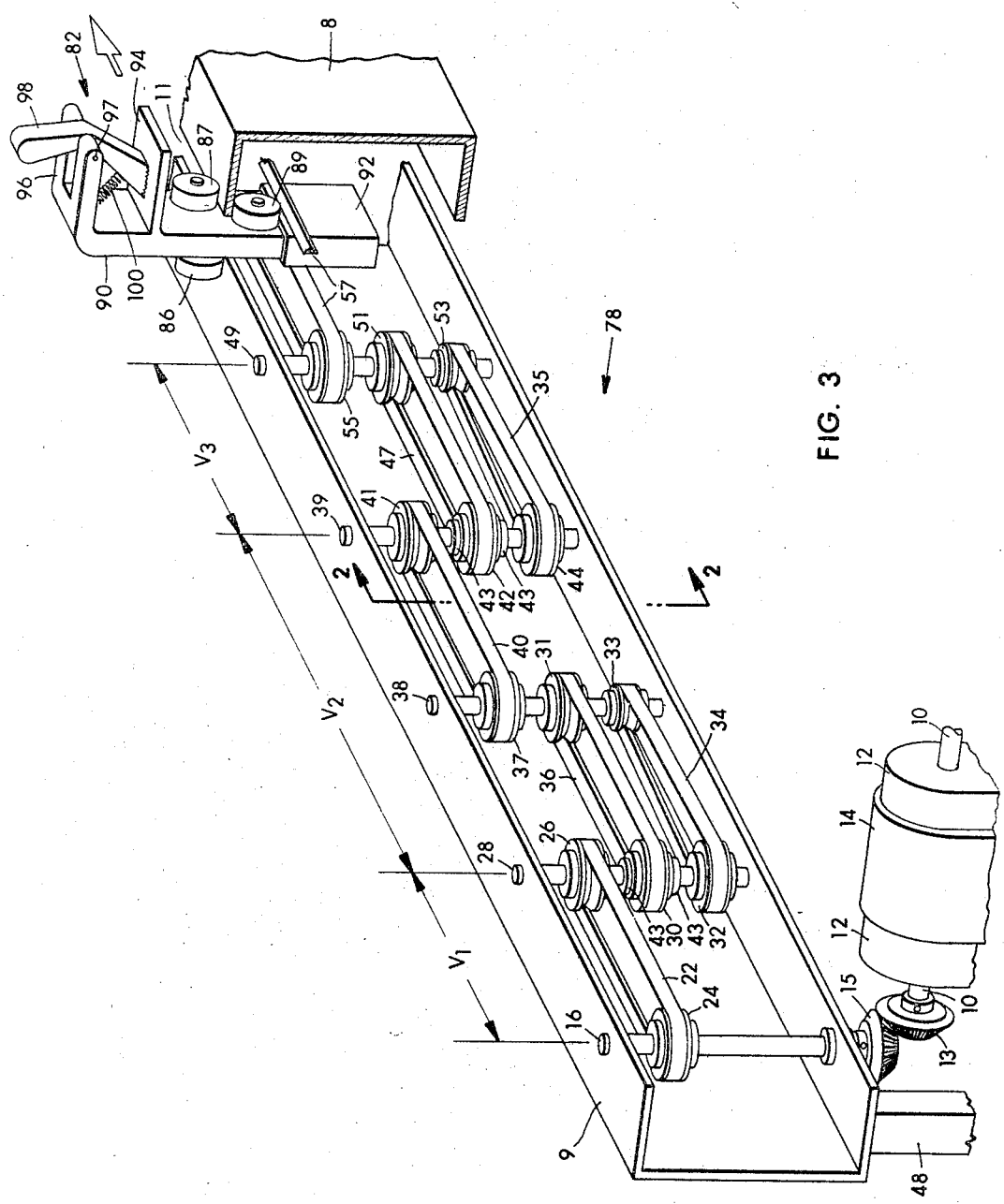

BY

PATENT ATTORNEY

United States Patent Office 3,427,684
Patented Feb. 18, 1969

3,427,684
BIAXIAL STRETCHING MACHINE
Hsue C. Tsien, Livingston, N.J., assignor to Esso Research and Engineering Company, a corporation of Delaware
Filed Jan. 26, 1967, Ser. No. 611,949
U.S. Cl. 18—1                                    9 Claims
Int. Cl. B29c 23/00; D06c 3/02; B65h 17/34

ABSTRACT OF THE DISCLOSURE

A biaxial stretching machine for plastic webs and other like materials having a web-clamp guiding means with a diverging portion. The web-clamp driving mechanism within said diverging portion comprising a series of belts and pulleys so arranged such that successive belts are driven at a faster rate of speed than previous belts whereby the web clamps are transported along said diverging portion at an increasing rate of speed, whereby the web material is stretched longitudinally and transversely.

Field of the invention

The present invention relates to a biaxial stretching machine for stretching web like sheet material of paper, plastic, textile, synthetic materials and the like. More particularly, this application is directed to new and improved driving mechanisms for such a biaxial stretching machine.

Thus it is an object of the present invention to provide an improved stretching machine of the above mentioned general type.

It is another object of the present invention to provide a biaxial stretching machine for stretching sheets in width and/or length to a variable degree.

It is a still further object of this invention to provide a stretching machine which is relatively simple to construct and operate and where efficiency and reliability of operation are high.

Yet another object of the invention is to provide a stretching machine wherein the drive mechanism comprises a series of belt and pulley or chain and sprocket drives in such number and dimension that the increment or decrement in speed of travel in proceeding from one belt and pulley combination to the next can be made so small as to be continuously or "infinitely" variable for practical purposes.

These and other objects and advantages of the invention will appear to those skilled in the art as the description proceeds with reference to the accompanying drawings.

Brief description of the drawings

FIGURE 3 is a fragmentary isometric view of a portion of the apparatus.

Description of preferred embodiments

Figure 1:
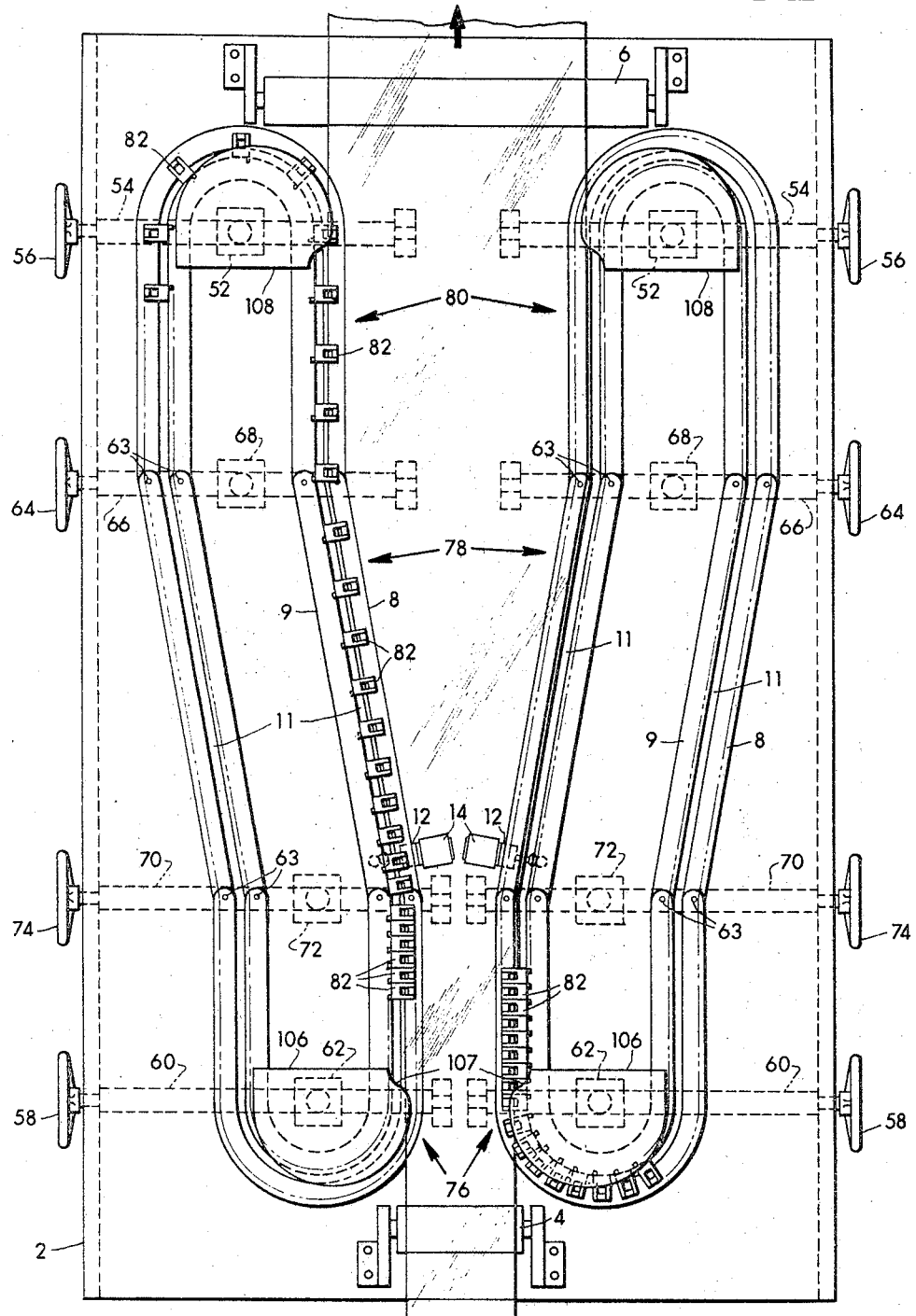
FIGURE 1 is a semi-schematic plan view of the machine embodying the present invention. Certain parts have been omitted for clarity of illustration while other parts are shown partially broken away.

Referring to FIGURE 1 in detail, the machine shown comprises a main structural frame designated generally at 2. Frame 2 supports an in-feed guide roller 4 and a discharge roller system 6 for receiving and guiding a web 50 of material to be stretched into and out of the machine. If desired, the roller system 6 may include means for edge trimming and/or means for slitting the web into various widths. The frame 2 also supports two pairs of closed loop guide tracks 8 and 9. Both pairs of tracks are exactly the same in their construction except that one represents the mirror image of the other as will be obvious to those skilled in the art. The inner track 8 and the outer track 9 are shown in greater detail in FIGURES 2 and 3, which will be hereinafter discussed in greater detail. Tracks 8 and 9 are parallel to each other but spaced apart to define a pathway therebetween. Tracks 8 and 9 are supported by any suitable support structure such as the post 48 indicated in FIGURE 3 for example. The post 48, of which there is a plurality, are mounted on movable base members which are not shown. These base members are respectively mounted on transverse slides 52, 62 and 72. These slides are respectively mounted on the ends of transverse screw shafts 54, 60 and 70 which are each journaled on the frame 2. The end portions of transverse screw shafts 54, 60 and 70 are provided with threads (not shown) so that rotation of these shafts by means of hand wheels 56, 58 and 74 will effect lateral adjustment of the slides 52, 62 and 72 towards or away from each other, depending upon the direction of rotation of the respective shafts. Thus adjustment of the three shafts 54, 60 and 70 may be accomplished as desired to regulate and adjust the degree of separation of the pairs of tracks 8 and 9. The portion of the tracks 8 and 9 adjacent to slides 62 define the entrance portion of the machine whereas those portions of the tracks 8 and 9 adjacent the slides 52 define the exit end of the machine, as will be subsequently described.

The tracks 8 and 9 and the space 11 defined therebetween form a pair of closed loop guides having entrance portions 76 which are substantially straight and parallel to each other, and diverging portions 78 which diverge outwardly from each other in the direction towards the discharge end of the machine. These diverging portions define a stretching zone which leads into the discharge portion 80. In this regard portion 80 of the two pair of tracks 8 and 9 may be substantially parallel or may converge slightly toward discharge roller complex 6, as will herein subsequently be discussed.

Figure 2:
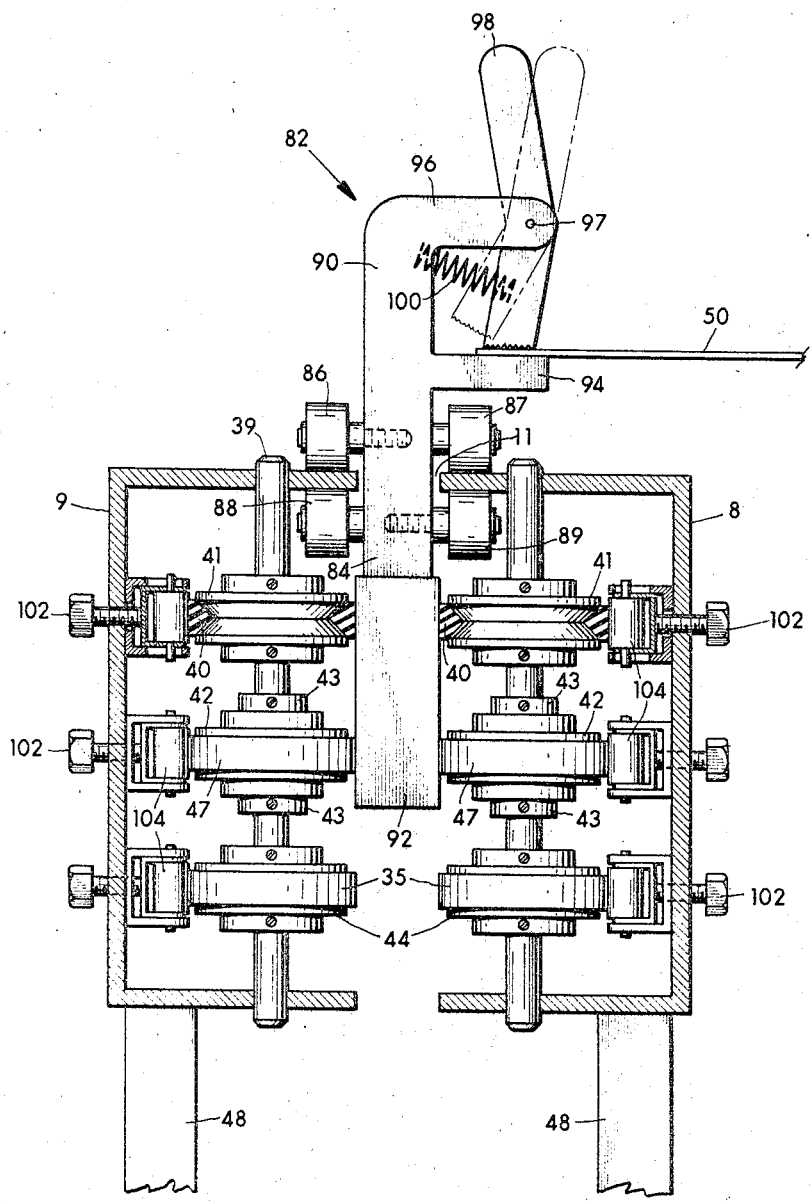
FIGURE 2 is an enlarged fragmentary sectional view taken along the line 2—2 of FIGURE 1.

A plurality of clamp carriages 82 are individually and separably movable along the tracks 8 and 9. FIGURE 2 more clearly shows the structure and arrangement of the clamp carriages 82.

Referring to FIGURE 2 in detail, the clamp structure 82 is provided with a downwardly projecting leg 84 on its body portion 90. Leg portion 84 projects downwardly through space 11 between guide tracks 8 and 9. Leg 84 is provided with a sleeve 92 which is made of a long wearing elastomeric material such as butyl or urethane rubber. As viewed in FIGURE 3 the near side of clamp 82 is provided with two vertically spaced rollers 86 and 89. Roller 86 engages the upper surface of track 9 and roller 89 engages the underside of the upper flange of track 8. Two additional rollers, 87 and 88, are provided on the far side of clamp body 90. Roller 87 engages the top surface of track 8 while roller 88 engages the underside of the upper flange of track 9. Thus the four rollers, 86, 87, 88 and 89, on each clamp support the clamp on the tracks 8 and 9 and due to their spacing also prevent tilting movement of the clamps in a plane parallel to the direction of movement along tracks 8 and 9. At a level above the upper surface of tracks 8 and 9, clamp 82 is provided with an inwardly extending flange member 94 spaced downwardly from a bracket-like arm 96. Bracket 96 is of yoke configuration and pivotally supports a gripping element 98 pivoted thereon by pin 97. The compression spring 100 normally pushes the bottom portion of gripping element 98 onto the surface of flange 94. The pivoted gripping element 98 is swingable between the full and dotted line positions shown in FIGURE 2. With element 98 in its solid line position, its bottom portion tends to wedge against the upper surface of flange 94 under the influence of compression spring 100 and thus is effective to grip and clamp an edge portion of a web 50 to the clamp 82. An outwardly applied force towards the top of member 98 will result in the release of web material 50.

Clamp 82 is moved in a direction perpendicular to the plane of FIGURE 2 by means of a series of belts and pulleys located in channel members 8 and 9. FIGURE 3 shows in detail the clamp conveying mechanism present within the channels 8 and 9 in the diverging or stretching portion 78 of the continuous loops defined by channels 8 and 9. Each of the channels 8 and 9 houses a series of belt drives which engage the elastomeric sleeve 92 of clamp leg 84 and convey it along the space 11 formed by the space between channels 8 and 9.

Tension on the belts may be adjusted positively by means of tension blocks 104 and screw adjustment means 102. The belts and pulleys are so arranged so as to increase the linear velocity of the clamp through space 11 as it proceeds from belt to belt as will now be described.

The belt and pulley arrangements present in channels 8 and 9 are driven by means of a motor 14 and a variable speed drive 12 at a synchronized rate of speed. Power is transmitted to the belt and pulley train of channel 9 via the beveled gears 13 and 15 which rotate shaft 16 having pulley 24 attached thereto. Pulley 24 drives belt 22 which in turn drives shaft 28 through the pulley 26 fixed to shaft 28. Shaft 28 is also provided with two additional pulleys, 30 and 32. Pulley 32 is fixed to shaft 28 whereas pulley 30 is free to assume its own speed on shaft 28 and is held in position by collar clamps 43. Belt 34 between pulleys 32 and 33 drives shaft 38. Depending upon the ratio of diameters of pulleys 32 and 33 and because pulleys 33, 31 and 37 are all keyed to shaft 38, the speed of belt 36 on pulleys 31 and 30 may be increased or decreased over the speed of belt 22 on pulleys 24 and 26. In a similar matter, depending on the ratio of diameters of pulleys 53 and 44, the speed of belt 47 may be increased or stepped up or decreased over the speed of belt 40 as previously described. Here again, pulley 42 is free to assume its own speed on shaft 39.

Figure 3A:
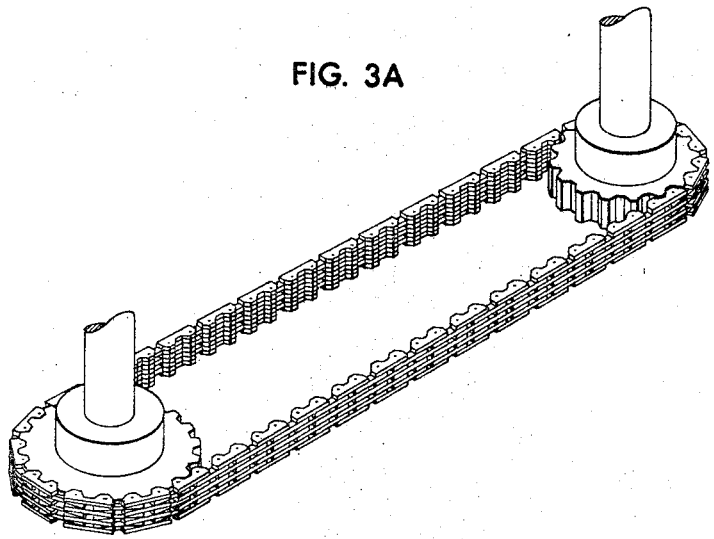
FIGURE 3a is an alternate to the drive depicted in FIGURE 3.
Figure 4:
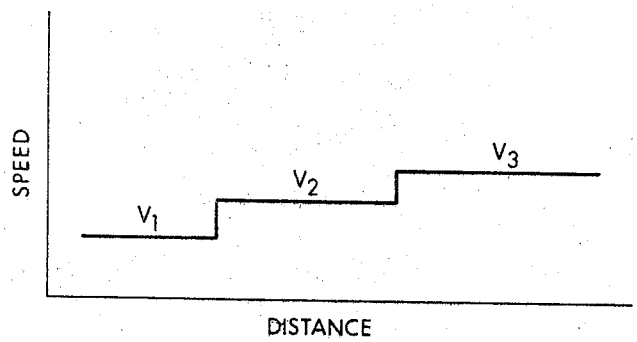
FIGURE 4 is a graphical representation wherein the transport velocity of the clamps is plotted against distance.

In operation, the sleeve 92 on downwardly projecting leg 84 of clamp 82 is thus first engaged in its upper portion by belt 22 and its corresponding belt in channel 8 (not shown). The clamp then proceeds to the point where it is transported by belt 36 and its matching belt in channel 8. This pair of belt engages leg 84 in a lower position than did the previous set of belts. As the clamp proceeds, therefore, it is alternately engaged by an upper belt set and then by a lower belt set. Thus as shown in FIGURE 4, the linear speed of the clamp 90 along the track 11 may be made to increase at it moves along the diverging portions of the loop formed by channels 8 and 9. By way of illustration, $V_1$ in FIGURE 4 would represent the velocity between shafts 16 and 28 of FIGURE 3. Similarly, $V_2$ would be the velocity of the clamp between shafts 28 and 39 and $V_3$ would represent the velocity of the clamp between shafts 39 and 49. While the speed changes are in steps, the distance between pulley centerlines can be reduced so that these steps can be rather small and film stretching can be made fairly uniform and satisfactory. If desired, the belts and pulleys discussed above can be of the chain and sprocket type as depicted in FIGURE 3a, with the general arrangement and workings remaining as hereinabove discussed.

As the clamps emerge from the divergent section 78 formed by channels 8 and 9, there is no longer any need for incremental velocity buildup and this feature of the belt and pulley drive is now omitted. However, to avoid a bunching up of the clamps upon their return to the entrance portion, it is desirable to step down their velocity until it is the same as when the clamps started into the entrance portion of the machine. This may readily be accomplished utilizing the teachings hereinbefore disclosed. Thus the belt and pulley drive sections in loops 8 and 9 with an appropriate speed step down serve to convey the clamps around the entire loop section bringing them back to their original starting point.

Referring once again to FIGURE 1, a cam plate 106 is provided towards the entrance portions of the loops. Cam plate 106 serves to prepare the clamps to engage web member 50 by applying an outward force towards the top of clamp member 98. This force compresses spring 100 and removes the bottom portion of member 98 from the top portion of flange 94. As the clamps swing around the cam plate 106, they engage web member 50 and at this point leave cam plate 106. The force being withdrawn from the upper portion of member 98, spring 100 forces the bottom portion of the clamp onto web member 50 clamping it between the bottom portion of member 98 and flange 94. In a similar fashion cam plates 108 are provided in the exit portions of the loops. These cams serve to release the clamps from the web prior to the latter's exit from the machine. Thus in operation the machine works as follows: The roller 4 guides a web 50 of stretchable material into the machine between the straight portions 76 of the trackways with the edges of the web in position to be engaged by the clamps 82. As explained above, the clamps are open as they reach the straight portions of the loop 76. Cam plate 106 is provided with "fall away" zone 107 so that after the clamps engage the film, contact is broken between cam plate 106 and the upper portion of member 98. Spring 100 then forces the bottom portion of member 98 onto the film and in turn onto the upper portion of flange 94, thus firmly clamping the film therebetween. It is to be understood that a sufficient number of clamps 82 are provided so that there is a continuous supply thereof approaching the entrance portions 76. Preferably, these will be arranged along the entire length of the loops in somewhat spaced relation and this may readily be achieved due to the workings of the pulley and belt drive herein before detailed.

As will be obvious to those skilled in the art, operation of the machine effects both a lateral and longitudinal stretching of web member 50. The lateral stretch is achieved by the divergency of the loops in portion 78, whereas the longitudinal stretch is achieved via the mechanism of the belt and pulley drive. The degree of longitudinal and lateral stretching is readily controlled. The longitudinal stretch is dependent upon the speed differentials of the various drive belts present in the belt and pulley mechanisms present in channels 8 and 9 in the divergent portion 78. The degree of lateral stretch is, of course, dependent on the angle of divergency between the two tracks. This angle may be accurately adjusted by moving slides 68 and 72 on transverse threaded members 66 and 70 by means of the adjustment wheels 64 and 74 provided respectively thereon. To facilitate this, the diverging portions of each loop are mounted to the adjacent sections pivotally by pivots 63.

After the web has left the divergent section of the loops, it may sometimes prove desirable to provide a relaxing stage. Thus portions 80 of the loop may sometimes be adjusted so that they are slightly convergent. This may be accomplished by use of the slides 52 on threaded transverse members 54 controlled by adjustment wheels 56. If a relaxing stage is desired in the longitudinal direction, the drive belts in this portion of each loop may be stepped down in speed as may readily be accomplished using the teachings herein previously described. Upon the films exit from this portion of the loops, cam plates 108 engages the upper portions 98 of clamps 82 thereby releasing the clamps from the film. The film is then withdrawn from the machine over roller assembly 6. The clamps then continue around the loop to their original starting point as previously discussed.

Since the stretching of film, which in most cases will be done under heat, does not require too much of a physical force, the drive system of the present invention only requires small fractional horsepower motors which may be located at low temperature zones. These motors may all be synchronized electrically by the commercially available electrical drive units such as U.S. Electric "Varidyne" drive. In addition by using the drive mechanism of the present invention, one can avoid the use of heavy screw spindles, chains and sprockets, universal joints and heavy duty bearing boxes which are present in the prior art. All driving pulleys, i.e. 24 and 26, 30 and 31, 37, etc., are interchangeable.

When heated thermoplastic materials are being stretched, it is possible that the clamps will absorb heat and possibly to an undesirable degree. In such cases, suitable cooling means (not illustrated) may be provided for cooling the clamps upon their return travel from the discharge end towards the entrance end of the machine.

Although the instant invention has been described with a certain degree of particularity, it is to be understood that the present disclosure has been made by way of example and that obviously changes in the detail of construction and arrangement of parts may be resorted to without departing from the spirit and scope of the invention as hereinafter claimed.

What is claimed is:

1. In a biaxial web stretching machine the improvement comprising a web stretching zone, said stretching zone being defined by a pair of guide means having a diverging portion, each of said guide means being defined by a pair of open channel members arranged in face-to-face configuration and held in spaced relation whereby a guide track is formed between them, a plurality of independent movable clamping means for engaging said web, said clamping means having a downwardly projecting leg, said clamping means further having means to facilitate its movement along said guide means, said clamping means being disposed on said guide means with said leg projecting into said guide track formed between said channel members, a motor driven series of belts and pulleys, said belts and pulleys being disposed in each of said channel members and arranged such that successive belts are driven at a faster rate of speed than previous belts, said downwardly projecting leg of said clamping means being engaged by said belts whereby said clamping means are transported along said diverging guide means at an increasing rate of speed, whereby said web is stretched in its longitudinal and transverse directions.

2. A machine as defined in claim 1 wherein each of said guide means defines a closed loop whereby each clamping means upon its exit from the said diverging portion may be guided back to the portion of said guide means where it initially engages said web.

3. A machine as defined in claim 1 wherein a web relaxing zone is provided after said stretching zone, said relaxing zone being defined by a pair of converging guide means, each of said guide means being defined by pivotable extensions of said channel members, a further series of belts and pulleys disposed in said extensions, said further series of belt and pulleys arranged such that successive belts are driven at a lower rate of speed than previous belts in said relaxing zone.

4. A machine as defined in claim 1 wherein said driving belts are of chain-type configuration and said pulleys are of sprocket-type configuration.

5. In a biaxial web stretching machine an improved driving means, said means comprising a pair of parallel channel members held in face-to-face configuration with a predefined gap therebetween, a plurality of driving belts and pulleys, said pulleys being so sized as to drive successive belts at a faster rate than previous belts, said belts and pulleys being disposed in each of said channels whereby a plurality of pairs of synchronized belts, each pair formed by one belt from each channel, can engage a downwardly projecting member and transport it along said predefined gap, the belt and pulley arrangements in each channel driven by synchronized motor means.

6. The machine of claim 5 wherein a plurality of adjusting means are provided on the inside of each of said channels for adjusting the tension on said belts.

7. In a biaxial stretching machine for plastic webs and the like, a web-clamp driving mechanism for transporting a plurality of web-clamps comprising two sets of belts and pulleys held in face-to-face relationship, the belts and pulleys of each of said sets so arranged such that successive belts are driven at a faster rate of speed than previous belts, means on said web-clamps for engaging a pair of belts driven at the same speed, one belt from each of said sets whereby said web-clamp is transported at an increasing rate of speed along said driving mechanism.

8. In a web-stretching machine for stretching plastic webs and the like, a web-clamp conveying mechanism for transporting a plurality of web-clamp members, each of said members having means for engaging said conveying mechanism, said conveying mechanism comprising in combination, a series of endless conveyor means, each subsequent conveyor means spaced from the previous conveyor means a distance which is less than the width of said engaging means on said clamps, said conveyor means thereby defining a continuing path for conveying said clamps; means for driving each successive conveyor means at a different rate of speed than the previous conveyor means; and guide track means for guiding the engaging means of said clamp members into successive contact with said conveyor means whereby said clamp members are transported at a changing rate of speed along said guide track means.

9. In a web-stretching machine for stretching plastic webs and the like, a web-clamp conveying mechanism for transporting a plurality of web-clamp members, each of said members having means for engaging said conveying mechanism, said conveying mechanism comprising a series of endless conveyor means arranged to sequentially contact a portion of said clamp members engaging means, and means for driving said endless conveyor means at different rates of speed whereby said clamp members are advanced at different rates of speed corresponding to the speed of the conveyor means contacting said engaging means.

References Cited

UNITED STATES PATENTS

| | | |
|---|---|---|
| 2,387,333 | 10/1945 | Kuzinski _____ 26—57 |
| 2,618,012 | 11/1952 | Milne. |
| 2,841,820 | 7/1958 | Pfeiffer. |
| 2,923,966 | 2/1960 | Tooke. |
| 3,172,150 | 3/1965 | Dornier. |
| 3,247,544 | 4/1966 | Bromley. |

WILLIAM J. STEPHENSON, *Primary Examiner.*

U.S. Cl. X.R.

226—173; 26—57